United States Patent
Fukui et al.

(10) Patent No.: US 9,514,003 B2
(45) Date of Patent: Dec. 6, 2016

(54) EXECUTING A FILE BACKUP PROCESS (71) Applicant: International Business Machines Corporation, Armonk, NY (US)

(72) Inventors: Yuto Fukui, Tokyo (JP); Sanehiro Furuichi, Tokyo (JP); Tomoaki Kohno, Tokyo (JP); Yukihiko Sohda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/198,709

(22) Filed: Mar. 6, 2014

(65) Prior Publication Data

US 2014/0289204 A1  Sep. 25, 2014

(30) Foreign Application Priority Data

Mar. 19, 2013  (JP) .................. 2013-057286

(51) Int. Cl.
G06F 17/00 (2006.01)
G06F 11/14 (2006.01)

(52) U.S. Cl.
CPC ....... *G06F 11/1464* (2013.01); *G06F 11/1453* (2013.01)

(58) Field of Classification Search
CPC .............. G06F 11/1458; G06F 11/1464; G06F 11/1453

(Continued)

(56) References Cited

U.S. PATENT DOCUMENTS 5,504,852 A * 4/1996 Thompson-Rohrlich  G06F 17/30067
715/835
5,666,530 A * 9/1997 Clark .................... G06F 1/1626

(Continued)

FOREIGN PATENT DOCUMENTS

JP  H0668047 A  3/1994
JP  2001290868 A  10/2001

(Continued)

OTHER PUBLICATIONS

Merle, Frédéric, et al., "Decentralized Documents Authoring System for Decentralized Teamwork—Matching Architecture with Organizational Structure", GROUP '12, Sanibel Island, FL, Oct. 27-31, 2012, pp. 117-120.*

(Continued)

*Primary Examiner* — Robert Stevens
(74) *Attorney, Agent, or Firm* — Yee & Associates, P.C.; Jeffrey S. LaBaw (57) ABSTRACT

A technique to execute a backup process efficiently when an identical file is owned by multiple persons in order to decrease storage capacity and traffic volume requirements. In a backup system including a backup execution terminal, backup destination terminals, and a management server, the backup execution terminal executes a deemed backup process for deeming the file identical to the target file and owned on the backup destination terminals to be a backup duplicate of the target file, or an actual backup process for sending the target file to the management server, each of the backup destination terminals stores the backup execution terminal and the file identical to the target file in association with each other at the time of the deemed backup, and the management server stores the target file sent from the backup execution terminal at the time of the actual backup.

20 Claims, 6 Drawing Sheets

(58) Field of Classification Search
USPC .......................................................... 707/654
See application file for complete search history.

(56) References Cited

U.S. PATENT DOCUMENTS

| | | | | |
|---|---|---|---|---|
| 5,778,389 | A * | 7/1998 | Pruett | G06F 17/30176 |
| 5,862,346 | A * | 1/1999 | Kley | G06Q 10/10 |
| | | | | 709/200 |
| 6,000,000 | A * | 12/1999 | Hawkins | G06F 17/30286 |
| | | | | 707/610 |
| 6,014,135 | A * | 1/2000 | Fernandes | G06F 3/0481 |
| | | | | 709/203 |
| 6,101,507 | A * | 8/2000 | Cane | G06F 11/1451 |
| | | | | 707/999.201 |
| 6,178,427 | B1 * | 1/2001 | Parker | G06F 11/2066 |
| 6,202,066 | B1 * | 3/2001 | Barkley | G06F 21/6218 |
| | | | | 707/785 |
| 6,226,650 | B1 * | 5/2001 | Mahajan | G06F 17/30575 |
| | | | | 379/93.12 |
| 6,237,008 | B1 * | 5/2001 | Beal | G06F 3/0619 |
| 6,289,357 | B1 * | 9/2001 | Parker | G06F 11/2082 |
| | | | | 707/610 |
| 6,505,214 | B1 * | 1/2003 | Sherman | G06F 17/30578 |
| 6,526,418 | B1 * | 2/2003 | Midgley | G06F 11/1451 |
| | | | | 707/640 |
| 6,574,657 | B1 * | 6/2003 | Dickinson | G06F 8/68 |
| | | | | 707/999.001 |
| 6,625,622 | B1 * | 9/2003 | Henrickson | G06F 9/4451 |
| 6,636,872 | B1 * | 10/2003 | Heath | G06F 17/30194 |
| 6,654,746 | B1 * | 11/2003 | Wong | G06F 17/30194 |
| 6,947,989 | B2 * | 9/2005 | Gullotta | G06F 21/6218 |
| | | | | 379/201.12 |
| 7,689,835 | B2 * | 3/2010 | Palliyil | G06F 21/56 |
| | | | | 713/187 |
| 7,734,690 | B2 * | 6/2010 | Moromisato | G06Q 10/10 |
| | | | | 709/204 |
| 7,747,995 | B2 * | 6/2010 | Fritsch | G06F 8/65 |
| | | | | 709/203 |
| 7,761,342 | B2 * | 7/2010 | Calabria | G06Q 10/10 |
| | | | | 705/26.1 |
| 2007/0185936 | A1 * | 8/2007 | Derk | G06F 11/1451 |
| 2009/0300169 | A1 * | 12/2009 | Sagar | H04L 12/24 |
| | | | | 709/224 |
| 2010/0242033 | A1 * | 9/2010 | Fritsch | G06F 8/65 |
| | | | | 717/171 |
| 2011/0106755 | A1 * | 5/2011 | Hao | G06F 11/1451 |
| | | | | 707/610 |
| 2013/0013560 | A1 * | 1/2013 | Goldberg | G06F 17/30174 |
| | | | | 707/634 |
| 2014/0019497 | A1 * | 1/2014 | Cidon | G06F 17/30194 |
| | | | | 707/827 |

FOREIGN PATENT DOCUMENTS

| | | |
|---|---|---|
| JP | 2002328847 A | 11/2002 |
| JP | 2003296035 A | 10/2003 |
| JP | 2005165486 A | 6/2005 |
| JP | 2005528684 A | 9/2005 |
| JP | 2006195546 A | 7/2006 |
| JP | 2007523392 A | 8/2007 |
| JP | 2008033519 A | 2/2008 |
| JP | 2009064214 A | 3/2009 |
| JP | 2012500427 A | 1/2012 |

OTHER PUBLICATIONS

Tang, John C., et al., "Exploring Patterns of Social Commonality Among File Directories at Work", CHI 2007, San Jose, CA, Apr. 28-May 3, 2007, pp. 951-960.*

* cited by examiner

EXECUTING A FILE BACKUP PROCESS

This application claims the benefit of priority to Japanese Patent Application No. JP 2013-057286, filed on Mar. 19, 2013, the contents of which are hereby incorporated by reference.

BACKGROUND

1. Technical Field

The present invention relates to a computer, a system, a method, and a program for executing a file backup process.

2. Background Art

Conventionally, as a backup method for enabling the recovery of data in the event of a data loss, there has been a method of prerecording the data on a medium such as a DVD or a magnetic tape. There has also been a method of building a large-scale storage system in which in-network file servers are integrated to manage data via the network.

For example, in a conventional technique disclosed in Patent Literature 1, any information processing apparatus within a network is set as a backup storage location, and the set backup storage terminal requests, acquires, and stores entity data to be shared.

CITATION LIST

Patent Literature

Patent Literature 1
Japanese Patent Application Publication No. 2006-195546

SUMMARY OF INVENTION

Technical Problems

With the recent increase in the capacity of a hard disk, a large number of files have been able to be stored in a device. However, along with the increase, the risk of losing critical data due to a malfunction or loss of the device has been increasing and hence the importance of backups has been increasing more than ever. On the other hand, in the conventional backup methods, even when multiple users own an identical file, each user executes a backup process individually.

Therefore, as individual backup processes increase, the required storage capacity increases. This also increases a traffic volume flowing through a communication path, causing a problem that the communication path becomes congested. It is an object of the present invention to execute a backup process efficiently when an identical file is owned by multiple persons in order to decrease storage capacity and traffic volume requirements.

Solution to Problems

In order to achieve the above object, the present invention is carried out as the following: A computer connected to other computers through a communication line, including: acquisition means for acquiring a list of other computers that own a file identical to a target file to be backed up and owned on its own machine and terminal information as information on the other computers presented in the list; determination means for determining whether to execute a deemed backup process for deeming the file identical to the target file and owned on the other computers to be a backup duplicate of the target file based on the list and the terminal information acquired by the acquisition means; and notification means which, when the determination means determines to execute the deemed backup process, notifies the other computers having the file identical to the target file that the file identical to the target file is deemed to be a backup duplicate of the target file.

It is preferred that the determination means of the computer should calculate the degree of ease of acquisition for acquiring the file identical to the target file based on the list and the terminal information acquired by the acquisition means to determine whether to execute the deemed backup process based on the calculated degree of ease of acquisition.

It is more preferred that the determination means of the computer should calculate the degree of ease of acquisition based on social distance as an index representing association between users of computers to acquire the file identical to the target file from the other computers used by users whose social distance to the user of the own machine falls within a certain range.

It is further preferred that the social distance is calculated based on at least either one of information on organizations to which users of the computers belong, information on communities to which the users of the computers belong, and e-mail transmission/reception histories of the users of the computers.

Further, the determination means of the computer calculates the degree of ease of acquisition to acquire the file identical to the target file from the other computers extracted as computers determined based on a predetermined criterion to be likely to have the file identical to the target file.

Further, it is preferred that the above-mentioned computer should further include: request means for selecting any of the other computers from the list acquired by the acquisition means to request, from the other computer selected, a file deemed to be a backup duplicate of the target file; and restoration means for receiving the file deemed to be the backup duplicate of the target file requested by the request means and restoring the target file from the file received.

The present invention is also carried out as the following: A computer system in which multiple computers are connected through a communication line, wherein a backup execution terminal for performing a backup among the multiple computers includes: acquisition means for acquiring a list of backup destination terminals having a file identical to a target file as a file to be backed up and owned on its own machine among the multiple computers, and terminal information as information on the backup destination terminals; determination means for determining whether to execute a deemed backup process for deeming the file identical to the target file and owned on the backup destination terminals to be a backup duplicate of the target file based on the list and the terminal information acquired by the acquisition means; and notification means which, when the determination means determines to execute the deemed backup process, notifies the backup destination terminals that the file identical to the target file is deemed to be a backup duplicate of the target file, and each of the backup destination terminals includes storage means for storing the backup execution terminal and the file identical to the target file in association with each other when receiving, from the backup execution terminal, the notification that the file identical to the target file is deemed to be the backup duplicate of the target file.

It is preferred that each of the backup destination terminals should further include generation means for monitoring whether the file identical to the target file stored by the storage means in association with the backup execution terminal is edited or deleted, and generating, under a certain condition, a duplicate of the file before being edited or deleted when the file identical to the target file is edited or deleted.

When the file identical to the target file is edited or deleted, the generation means of the backup destination terminal generates a duplicate of the target file on condition that the degree of ease of acquisition to which the backup execution terminal acquires the file identical to the target file is smaller than a predetermined threshold.

The present invention is further carried out as the following: A computer system in which a server computer and multiple client computers are connected through a communication line, wherein a backup execution terminal for performing a backup among the multiple client computers includes: acquisition means for acquiring a list of backup destination terminals having a file identical to a target file as a file to be backed up and owned on its own machine among the multiple client computers, and terminal information as information on the backup destination terminals; and backup execution means for calculating the degree of ease of acquisition for acquiring the file identical to the target file based on the list and the terminal information acquired by the acquisition means, and executing a deemed backup process for deeming the file identical to the target file and owned on the backup destination terminals to be a backup duplicate of the target file when the calculated degree of ease of acquisition is larger than or equal to a predetermined threshold, or an actual backup process for sending the target file to the server computer to perform a backup when the degree of ease of acquisition is smaller than the predetermined threshold, each of the backup destination terminals includes storage means for storing the backup execution terminal and the file identical to the target file in association with each other when receiving, from the backup execution terminal, a notification that the file identical to the target file is deemed to be the backup duplicate of the target file, and the server computer includes storage means for storing the target file sent from the backup execution terminal when the actual backup process is executed by the backup execution means.

It is preferred that, when the degree of ease of acquisition becomes smaller than the predetermined threshold after the deemed backup process is executed on the target file, the backup execution means of the backup execution terminal should execute the actual backup process on the target file.

Further, when the degree of ease of acquisition becomes larger than or equal to the predetermined threshold after the actual backup process is executed on the target file, the backup execution means of the backup execution terminal executes the deemed backup process on the target file, and when the backup execution means of the backup execution terminal executes the deemed backup process on the target file after the storage means of the server computer stores the target file sent from the backup execution terminal, the storage means of the server computer deletes the stored target file.

Further, the present invention is carried out as a method for a computer connected to other computers through a communication line to perform a backup. This method includes: acquiring a list of the other computers having a file identical to a target file as a file to be backed up and owned on the computer, and terminal information as information on the other computers presented in the list; determining whether to execute a deemed backup process for deeming the file identical to the target file and owned on the other computers to be a backup duplicate of the target file based on the list and the terminal information acquired; and when determining to execute the deemed backup process, notifying the other computers having the file identical to the target file that the file identical to the target file is deemed to be a backup duplicate of the target file.

Further, the present invention is carried out as a method in which a server computer and multiple client computers are connected through a communication line and a first computer in the multiple client computers performs a backup, the method including: acquiring a list of second computers having a file identical to a target file as a file to be backed up and owned on the first computer among the multiple client computers, and terminal information as information on the second computers; calculating the degree of ease of acquisition to which the first computer acquires the file identical to the target file based on the list and the terminal information acquired, and executing a deemed backup process for deeming the file identical to the target file and owned on the second computers to be a backup duplicate of the target file when the calculated degree of ease of acquisition is larger than or equal to a predetermined threshold, or executing an actual backup process for sending the target file to the server computer to perform a backup when the degree of ease of acquisition is smaller than the predetermined threshold; causing the second computers to store the first computer and the file identical to the target file in association with each other when receiving, from the first computer, a notification that the file identical to the target file is deemed to be the backup duplicate of the target file; and causing the server computer to store the target file sent from the first computer when the actual backup process is executed.

In addition, the present invention is carried out as a program for controlling a computer to implement each of the functions of the above-mentioned machines, or a program for causing a computer to execute each of the steps of the above methods. This program can be distributed in a form of being stored on a magnetic disk, an optical disk, a semiconductor memory, or any other recording medium, or delivered through a network.

Advantageous Effect of the Invention

According to the present invention, a backup process is performed efficiently when an identical file is owned by multiple persons to enable a decrease in storage capacity and traffic volume requirements.

DETAILED DESCRIPTION OF THE DRAWINGS

An embodiment of the present invention will be described below with reference to the accompanying drawings.

<System Configuration>

Figure 1:
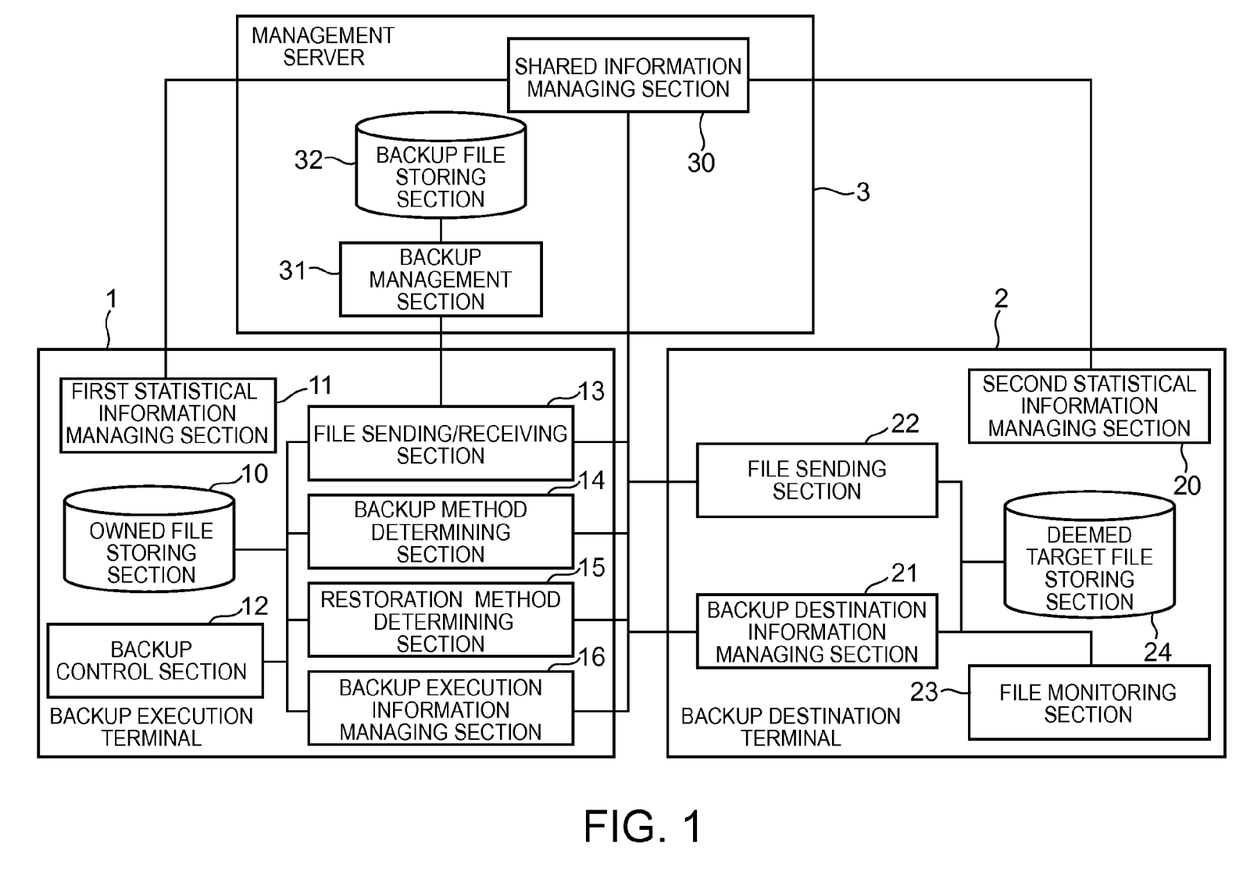
FIG. 1 is a diagram showing a configuration example of a backup system according to an embodiment.

FIG. 1 is a diagram showing a configuration example of a backup system according to the embodiment.

The backup system according to the embodiment includes a backup execution terminal 1, a backup destination terminal 2, and a management server 3, which are interconnected through a communication line. This backup system includes one or more backup execution terminals 1 and one or more backup destination terminals 2, but the backup system shown in FIG. 1 is assumed to include one backup execution terminal 1 and multiple backup destination terminals 2. Further, in the backup system shown in FIG. 1, it is assumed that the backup execution terminal 1 and the backup destination terminal 2 are different terminals, but there may be a terminal that implements both the function of the backup execution terminal 1 and the function of the backup destination terminal 2.

The backup execution terminal 1 selects a file to be backed up from files owned on its own machine (hereinafter called a target file), and calculates the ease of restoration as an example of the degree of ease of acquisition at other terminals having a file identical to the target file (hereinafter called the identical file) within the backup system. Then, the backup execution terminal 1 executes either a deemed backup process or an actual backup process based on the calculated value of ease of restoration. Here, the term "deemed backup" means that the backup execution terminal 1 deems the identical file owned on the other terminals as a backup duplicate of the target file without sending the target file. The term "actual backup" means that the backup execution terminal 1 actually sends the target file to the management server 3 to set the management server 3 as the backup destination.

The ease of restoration means the degree of ease of restoration when the backup execution terminal 1 acquires the identical file and restores the target file. The ease of restoration is a value based on the ease of procurement and the number of procurement terminals to be mentioned below.

The ease of procurement is a value representing, for each terminal as a procurement source, the ease of procurement when the backup execution terminal 1 procures the identical file from other terminals having the identical file in the backup system.

For example, terminals with a high probability of being online in the same time slot as the backup execution terminal 1 are likely to be accessible when the backup execution terminal 1 restores the target file. Therefore, the ease of procurement from such terminals to the backup execution terminal 1 is high. In this case, for example, the duration in which each terminal is online simultaneously with the backup execution terminal 1 is measured based on the operating time of the terminal in a certain period to calculate a numeric value for each terminal by a predetermined calculation formula based on the measured duration. This calculated numeric value is the ease of procurement from each terminal to the backup execution terminal 1.

As another example, since a desktop terminal that is less likely to be moved is considered to be more likely to be accessible upon restoration than a mobile terminal, the ease of procurement from such a terminal is high. Further, as for a terminal with little disk space available, even when the terminal has the identical file, since there is a high possibility that the identical file is deleted by a user, the ease of procurement from such a terminal is low.

The number of procurement terminals is the number of terminals having the identical file in the backup system other than the backup execution terminal 1. The more the number of procurement terminals, the more the number of request destinations from which the backup execution terminal 1 can request a file used for restoration. On the other hand, the less the number of procurement terminals, the less the number of request destinations from which the backup execution terminal 1 can request the file used for restoration.

Here, when the number of procurement terminals is large and further the number of terminals with high ease of procurement is large, it is easy for the backup execution terminal 1 to restore the target file, resulting in high ease of restoration.

However, even when the number of procurement terminals is large, if the terminals all have low ease of procurement, it may be hard for the backup execution terminal 1 to restore the target file. For example, when terminals having the identical file have only less duration of being online simultaneously with the backup execution terminal 1, it is considered that the backup execution terminal 1 may take a long time to restore the target file even if the number of terminals is large. In such a case, the ease of restoration is low.

On the other hand, even when the number of procurement terminals is small, if there is a terminal with high ease of procurement, it may be easy for the backup execution terminal 1 to restore the target file. For example, if a terminal having the identical file is in a constant state of being online together with the backup execution terminal 1, it is considered that the backup execution terminal 1 can restore the target file immediately even if the number of procurement terminals is small. In such a case, the ease of restoration is high.

As mentioned above, the ease of restoration is a value calculated based on the ease of procurement from each terminal and the number of procurement terminals. Further, it may be a case where the ease of procurement is emphasized or a case where the number of procurement terminals is emphasized. According to both levels of importance, the ease of procurement and the number of procurement terminals may be weighted to calculate the ease of restoration.

The backup destination terminals 2 are terminals having the identical file in the backup system and deemed by the backup execution terminal 1 to be the backup destinations of the target file. When the backup execution terminal 1 restores the target file, a backup destination terminal 2 selected by the backup execution terminal 1 sends the identical file to the backup execution terminal 1.

Upon actual backup, the management server 3 receives the target file from the backup execution terminal 1 and functions as a backup destination of the backup execution terminal 1. The management server 3 further receives, from each terminal in the backup system, a list of files owned on the terminal and terminal information to manage the list of files and the terminal information. Here, the terminal information is information necessary to calculate the ease of procurement, indicating the operating time or the disk capacity of each of the above-mentioned terminals.

Functional Configuration of Backup Execution Terminal

In the backup system shown in FIG. 1, the backup execution terminal 1 includes an owned file storing section 10 for storing files owned on the backup execution terminal 1, a first statistical information managing section 11 for recording a list of files owned on the backup execution terminal 1 and terminal information and sending them to the management server 3, a backup control section 12 for selecting a target file and performing a backup, a file sending/receiving section 13 for sending and receiving files at the time of the backup or restoration, a backup method determining section 14 for determining a backup method based on the ease of restoration calculated, a restoration method determining section 15 for determining a restoration method based on the ease of restoration calculated, and a backup execution information managing section 16 for notifying each terminal having the identical file that the terminal has been set as a backup destination.

The owned file storing section 10 stores various kinds of files owned on the backup execution terminal 1.

The first statistical information managing section 11 records the files stored in the owned file storing section 10 and terminal information on the backup execution terminal 1, and sends a list of recorded files and the terminal information to the management server 3.

The backup control section 12 as an example of backup execution means selects a target file from the owned file storing section 10 and instructs the backup method determining section 14 to determine a backup method for the target file selected. Then, based on the determination made by the backup method determining section 14, the backup control section 12 performs either a deemed backup or an actual backup. In the case of deemed backup, the backup control section 12 instructs the backup execution information managing section 16 to notify each terminal having the identical file that the terminal has been set as a backup destination terminal 2. In the case of actual backup, the backup control section 12 instructs the file sending/receiving section 13 to send the target file to the management server 3.

When the setting of backup destination terminals 2 for the selected target file already exists, the backup control section 12 instructs the backup execution information managing section 16 to notify the backup destination terminals 2 that the setting has been deleted in order to switch from the old setting to a new setting.

The backup control section 12 as an example of restoration means further selects, from the owned file storing section 10, a file to be restored (hereinafter called a restoration target file) among target files that have been backed up, and instructs the restoration method determining section 15 to determine a restoration method for the selected restoration target file. Then, based on the determination made by the restoration method determining section 15, the backup control section 12 restores the restoration target file. Here, when the file is to be restored from a backup destination terminal 2, the backup control section 12 instructs the file sending/receiving section 13 to send a restoration request to the backup destination terminal 2, and receives a file identical to the restoration target file (hereinafter called a restored file). On the other hand, when the file is to be restored from the management server 3, the backup control section 12 instructs the file sending/receiving section 13 to send a restoration request to the management server 3, and receives a restoration target file that has been sent to the management server 3.

Upon actual backup, the file sending/receiving section 13 sends the target file to the management server 3. When the file is to be restored from the backup destination terminal 2, the file sending/receiving section 13 as an example of request means makes a request to the backup destination terminal 2 for a restored file deemed as a backup duplicate of the restoration target file. On the other hand, when the file is to be restored from the management server 3, the file sending/receiving section 13 makes a request to the management server 3 for the restoration target file.

The backup method determining section 14 as an example of acquisition means, determination means, and backup execution means determines a backup method based on the number of procurement terminals and the ease of procurement from each terminal. Here, the backup method determining section 14 first acquires, from the management server 3, a list of terminals having the identical file in the backup system and terminal information as information on each of the terminals presented in the list. Then, based on the list of terminals having the identical file and the terminal information, the backup method determining section 14 calculates the ease of restoration, and performs either the deemed backup or the actual backup based on the calculated value of ease of restoration.

In other words, the backup method determining section 14 determines whether the number of procurement terminals is more than or equal to a predetermined number of terminals. When the number of procurement terminals is less than the predetermined number of terminals, the backup method determining section 14 determines to perform the actual backup. On the other hand, when the number of procurement terminals is more than or equal to the predetermined number of terminals, the backup method determining section 14 calculates the ease of procurement from each terminal based on the terminal information on each of the terminals having the identical file. Then, the backup method determining section 14 sums up the values of ease of procurement from the respective terminals, and determines whether the total ease of procurement is more than or equal to a predetermined threshold. When the total ease of procurement is more than or equal to the threshold, the backup method determining section 14 determines to perform the deemed backup. On the other hand, when the total ease of procurement is less than the threshold, the backup method determining section 14 determines to perform the actual backup.

The backup method determining section 14 determines the backup method based on the value of ease of restoration. Therefore, if the ease of restoration is reduced after the deemed backup is performed, the backup method determining section 14 may determine to perform the actual backup. Similarly, if the ease of restoration is increased after the actual backup is performed, the backup method determining section 14 may determine to perform the deemed backup.

The restoration method determining section 15 as an example of request means determines the restoration method based on the ease of restoration from each of backup destination terminals 2 having the restored file. Here, the restoration method determining section 15 first acquires, from the management server 3, a list of backup destination terminals 2 having the restored file in the backup system and terminal information on each of the backup destination terminals 2. When backup destination terminals 2 having the restored file exist, the restoration method determining section 15 calculates the ease of procurement from each backup destination terminal 2 based on the acquired terminal information on each of the backup destination terminals 2. Then, the restoration method determining section 15 selects one of the backup destination terminals 2 from which the restored file is requested. In this selection, for example, the restoration method determining section 15 selects one of terminals that are online and accessible from the backup execution terminal 1. On the other hand, when no backup destination terminal 2 having the restored file exists, since this means that the restoration target file exists on the management server 3, the restoration method determining section 15 determines to restore the file from the management server 3.

Upon deemed backup, the backup execution information managing section 16 as an example of notification means sets each terminal having the identical file in the backup system as the backup destination terminal 2. Then, the backup execution information managing section 16 provides a setting notification for notifying each of the set backup destination terminals 2 that it has been set as the backup destination terminal 2, i.e., that the identical file is deemed to be a backup duplicate of the target file.

When the setting of backup destination terminals 2 for the file selected as the target file already exists, the backup execution information managing section 16 deletes the setting of the backup destination terminals 2 to switch from the old setting to a new setting. Then, the backup execution information managing section 16 provides a deletion notification for notifying each of the backup destination terminals 2, the setting of which is deleted, of the deletion of the setting.

Functional Configuration of Backup Destination Terminal

In the backup system shown in FIG. 1, each backup destination terminal 2 includes a second statistical information managing section 20 for sending the management server 3 a list of files owned on the backup destination terminal 2 and terminal information, a backup destination information managing section 21 for managing the backup execution terminal 1 and the identical file in association with each other, a file sending section 22 for sending the backup execution terminal 1 a restored file upon restoration, a file monitoring section 23 for monitoring the situation of editing or deleting the identical file, and a deemed target file storing section 24 for storing the identical file (restored file) and a duplicate of the identical file.

Like the first statistical information managing section 11 of the backup execution terminal 1, the second statistical information managing section 20 records various kinds of files owned on the backup destination terminal 2 and terminal information on the backup destination terminal 2, and sends a list of recorded files and the terminal information to the management server 3.

The backup destination information managing section 21 as an example of storage means determines whether a notification from the backup execution information managing section 16 of the backup execution terminal 1 is the setting notification or the deletion notification, and stores, based on the notification, an identical file in association with the backup execution terminal 1 that deems the identical file to be a backup duplicate of the target file. The backup destination information managing section 21 further sends the notification content to the file monitoring section 23.

When a restored file is requested from the backup execution terminal 1, the backup destination information managing section 21 checks on the restored file stored in the deemed target file storing section 24. Then, the backup destination information managing section 21 determines whether the restored file has been edited or deleted by the user after receiving the setting notification from the backup execution terminal 1. When the restored file is not edited or deleted, the backup destination information managing section 21 instructs the file sending section 22 to send the restored file to the backup execution terminal 1. On the other hand, when the restored file is edited or deleted, the backup destination information managing section 21 determines whether there is a duplicate of the restored file before being edited or deleted. When there is a duplicate of the restored file before being edited or deleted, the backup destination information managing section 21 instructs the file sending section 22 to send the backup execution terminal 1 the duplicate of the restored file before being edited or deleted. On the other hand, when there is no duplicate of the restored file before being edited or deleted, the backup destination information managing section 21 instructs the file sending section 22 to send an error to the backup execution terminal 1.

Further, when the identical file monitored by the file monitoring section 23 is edited or deleted by the user, the backup destination information managing section 21 receives a request from the file monitoring section 23 before editing or deletion processing is confirmed, and requests the backup execution terminal 1 having the target file corresponding to the identical file to send up-to-date information on the number of procurement terminals for the target file and the ease of procurement.

In response to the request for the restored file from the backup execution terminal 1, the file sending section 22 sends the restored file to the backup execution terminal 1. When the restored file is edited or deleted by the user, the file sending section 22 sends the backup execution terminal 1 a duplicate of the restored file before being edited or deleted. When there is no duplicate of the restored file before being edited or deleted, the file sending section 22 sends the backup execution terminal 1 an error for giving notice that it does not have the restored file.

The file monitoring section 23 as an example of generation means monitors the situation of user's editing or deletion of the identical file. Here, in response to the setting notification from the backup execution terminal 1, the file monitoring section 23 adds the identical file to a monitoring list to monitor the identical file. On the other hand, in response to the deletion notification from the backup execution terminal 1, the file monitoring section 23 deletes the identical file from the monitoring list.

Here, when there are two or more backup execution terminals 1, a correspondence relationship between the identical file and a backup execution terminal 1 that deems the identical file to be used for backup is also recorded in the monitoring list. Therefore, for example, when even an identical file for which the deletion notification is received is deemed to be used for backup purpose of a backup execution terminal 1 that does not send the deletion notification, the monitoring of the identical file is continued.

Further, when the identical file is edited or deleted by the user, the file monitoring section 23 requests, from the backup destination information managing section 21, up-to-date information on the number of procurement terminals for the target file and the ease of procurement before editing or deletion processing is confirmed. Then, based on the up-to-date information sent from the backup execution terminal 1, the file monitoring section 23 determines whether there is a need to generate a duplicate of the identical file before being edited or deleted.

Here, the file monitoring section 23 determines whether the number of procurement terminals for the target file becomes smaller than the predetermined number of terminals because of the fact that the identical file is edited or deleted. The file monitoring section 23 further determines whether the total value of ease of procurement of the target file from respective terminals becomes smaller than the predetermined threshold because of the fact that the identical file is edited or deleted. Even when the identical file is deleted, if the number of procurement terminals is more than or equal to the predetermined number of terminals and the total value of ease of procurement is more than or equal to the predetermined threshold, it can be said that the conditions for the backup execution terminal 1 to perform a deemed backup are met. Therefore, the file monitoring section 23 deletes the correspondence relationship between the backup execution terminal 1 and the identical file from the monitoring list without generating a duplicate of the identical file before being edited or deleted. Then, the file monitoring section 23 notifies the backup execution terminal 1 that the identical file is deleted from the monitoring list.

On the other hand, when the number of procurement terminals becomes smaller than the predetermined number of terminals because of the fact that the identical file is edited or deleted, or when the ease of procurement becomes smaller than the predetermined threshold, it can be said that the conditions for the backup execution terminal 1 to perform the deemed backup are not met. Therefore, the file monitoring section 23 generates a duplicate of the identical file before being edited or deleted. After the file monitoring section 23 generates the duplicate of the identical file, when the backup execution terminal 1 completes the transmission of the target file to the management server 3, or when other terminals having the identical file are newly found so that the number of procurement terminals will become more than or equal to the threshold and the total value of ease of procurement will become more than or equal to the threshold, the file monitoring section 23 deletes the duplicate of the identical file.

The deemed target file storing section 24 stores the identical file deemed to be used for backup by the backup execution terminal 1 and the duplicate of the identical file generated by the file monitoring section 23.

Functional Configuration of Management Server

In the backup system shown in FIG. 1, the management server 3 includes a shared information managing section 30 for managing a list of files owned on each terminal and terminal information, a backup management section 31 for exchanging files with the backup execution terminal 1, and a backup file storing section 32 for storing a target file sent from the backup execution terminal 1.

The shared information managing section 30 stores the list of files owned on each terminal and sent from the each terminal in the backup system and the terminal information on each terminal. Then, the shared information managing section 30 sends the backup execution terminal 1 a list of terminals having the identical file in the backup system and terminal information on each terminal having the identical file. The shared information managing section 30 further sends the backup execution terminal 1 a list of terminals having a restored file in the backup system and terminal information on each terminal having the restored file.

Upon actual backup, the backup management section 31 receives the target file from the backup execution terminal 1. Further, in response to a request for a restoration target file from the backup execution terminal 1, the backup management section 31 sends the restoration target file to the backup execution terminal 1.

The backup file storing section 32 as an example of storage means stores the target file sent from the backup execution terminal 1 at the time of the actual backup.

Procedure Upon Backup at Backup Execution Terminal 1

Figure 2:
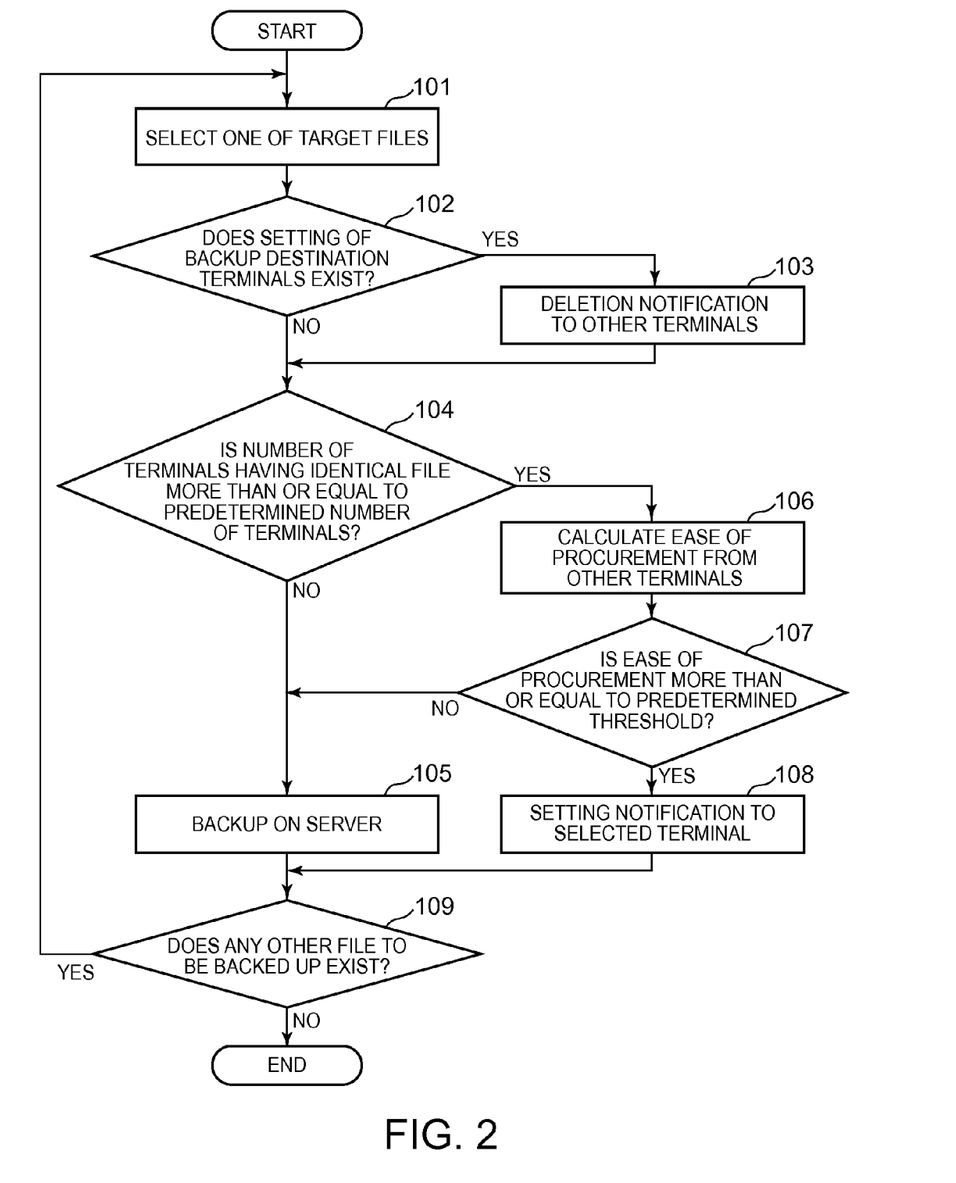
FIG. 2 is a flowchart showing an example of a procedure upon backup at a backup execution terminal.

FIG. 2 is a flowchart showing an example of a procedure upon backup at the backup execution terminal 1.

First, the backup control section 12 selects one of target files from the owned file storing section 10 (step 101). Next, the backup control section 12 determines whether the setting of backup destination terminals 2 for the selected target file already exists (step 102). When the setting of backup destination terminals 2 already exists, the backup execution information managing section 16 deletes the setting of the backup destination terminals 2 and provides a deletion notification (step 103).

Next, the backup method determining section 14 acquires, from the management server 3, a list of terminals having an identical file in the backup system and terminal information on each terminal. Then, the backup method determining section 14 determines whether the number of procurement terminals is more than or equal to the predetermined number of terminals (step 104). When the number of procurement terminals is less than the predetermined number of terminals, the backup method determining section 14 determines to perform an actual backup. As a result of the determination, the file sending/receiving section 13 sends the target file to the management server 3 (step 105).

On the other hand, in step 104, when the number of procurement terminals is more than or equal to the predetermined number of terminals, the backup method determining section 14 calculates the ease of procurement from each terminal based on the terminal information on each terminal (step 106). Next, the backup method determining section 14 sums up the values of ease of procurement from the respective terminals, and determines whether the total ease of procurement is more than or equal to the predetermined threshold (step 107). When the total ease of procurement is smaller than the threshold, the backup method determining section 14 determines to perform an actual backup like in step 105. On the other hand, when the ease of procurement is more than or equal to the threshold, the backup method determining section 14 determines to perform a deemed backup. As a result of the determination, the backup execution information managing section 16 sets each terminal having the identical file as a backup destination terminal 2, and provides a setting notification to each terminal (step 108).

Next, the backup control section 12 determines whether any other target file to be backed up exists (step 109). When any other target file exists, processing step 101 is continuously executed. On the other hand, when no target file exists, the processing is ended.

Procedure Upon Backup at Backup Destination Terminal 2

Figure 3:
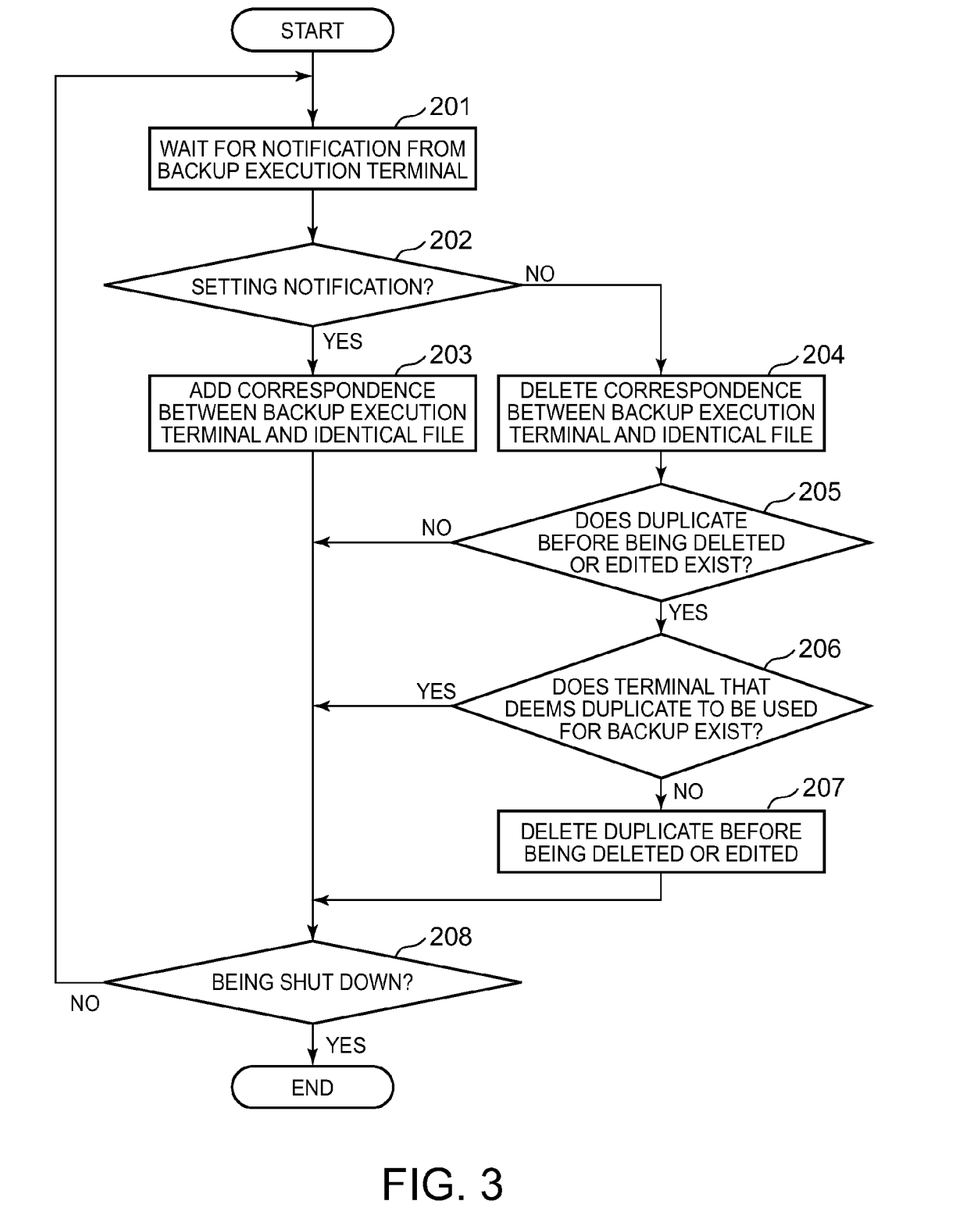
FIG. 3 is a flowchart showing an example of a procedure upon backup at a backup destination terminal.

FIG. 3 is a flowchart showing an example of a procedure upon backup at a backup destination terminal 2.

It is assumed as the initial state that the backup destination information managing section 21 waits for a notification from the backup execution terminal 1 (step 201). Then, when receiving a notification from the backup execution terminal 1, the backup destination information managing section 21 determines whether the notification is a setting notification, and based on the content of the notification, the backup destination information managing section 21 stores a correspondence relationship between the backup execution terminal 1 and the identical file (step 202). When the notification is the setting notification, the file monitoring section 23 adds, to the monitoring list, the backup execution terminal 1 and the identical file in association with each other to monitor the identical file (step 203).

On the other hand, when the notification is not the setting notification, since the notification is a deletion notification, the file monitoring section 23 deletes, from the monitoring list, the correspondence relationship between the backup execution terminal 1 and the identical file (step 204). Next, the file monitoring section 23 determines whether a duplicate of the identical file before being edited or deleted has been generated as a result of the fact that the identical file was edited or deleted by the user in the past (step 205). When a duplicate of the identical file has been generated, the file monitoring section 23 determines whether a backup execution terminal 1 that deems this duplicate of the identical file to be used for backup exists (step 206). When a backup execution terminal 1 that deems the duplicate of the identical file to be used for backup exists, the file monitoring section 23 does not delete the duplicate of the identical file. On the other hand, when no backup execution terminal 1 that deems the duplicate of the identical file to be used for backup exists, since the duplicate of the identical file is unnecessary, the file monitoring section 23 deletes the duplicate of the identical file (step 207).

Then, the backup destination information managing section 21 waits for a notification from the backup execution terminal 1 unless the backup destination terminal 2 is shut down, repeating processing step 201 to step 207 (step 208).

Procedure Upon Restoration at Backup Execution Terminal 1

Figure 4:
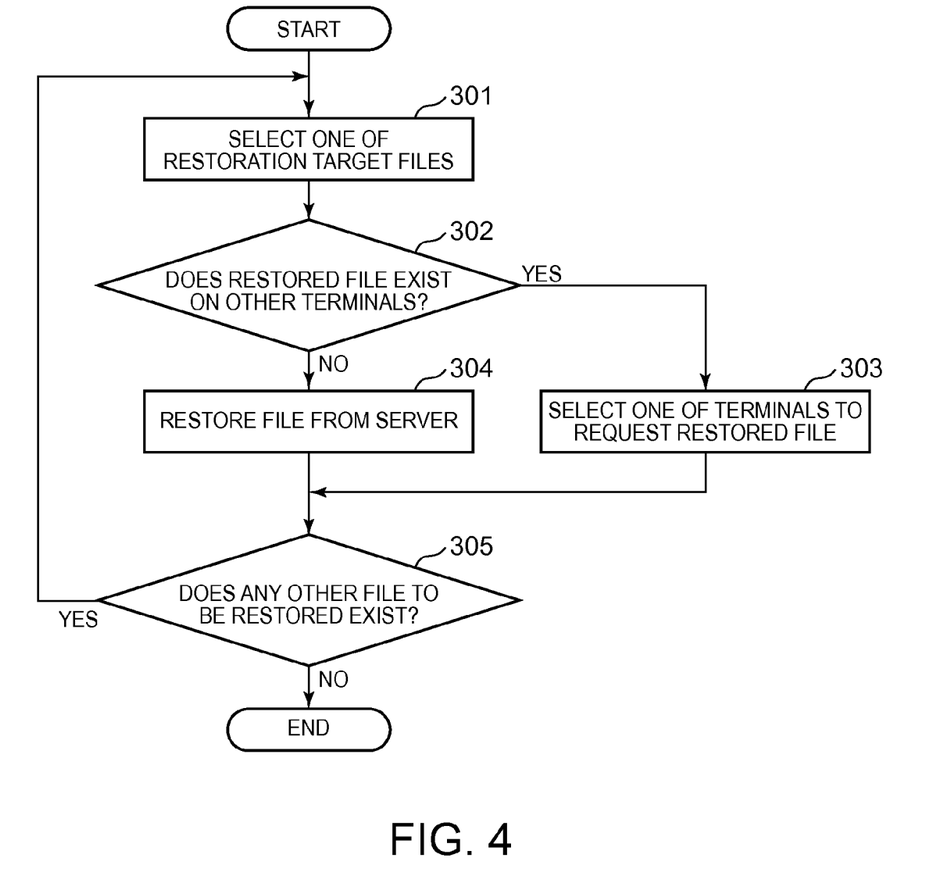
FIG. 4 is a flowchart showing an example of a procedure upon restoration at the backup execution terminal.

FIG. 4 is a flowchart showing an example of a procedure upon restoration at the backup execution terminal 1.

First, the backup control section 12 selects one of target files from the owned file storing section 10 (step 301). Next, the restoration method determining section 15 acquires, from the management server 3, a list of backup destination terminals 2 having a restored file in the backup system and terminal information on each terminal. Then, the restoration method determining section 15 determines whether backup destination terminals 2 having the restored file exist (step 302).

When backup destination terminals 2 having the restored file exist, the restoration method determining section 15 determines to restore the file from any of the backup destination terminals 2 rather than from the management server 3. Next, the restoration method determining section 15 calculates the ease of procurement from each backup destination terminal 2 to select one of the backup destination terminals 2 to which a request is to be made for the restored file. Then, the file sending/receiving section 13 requests the restored file from the selected backup destination terminal 2, and receives the restored file (step 303). On the other hand, when no backup destination terminal 2 having the restored file exists, the restoration method determining section 15 determines to restore the file from the management server 3. As a result of the determination, the file sending/receiving section 13 requests and receives the restoration target file from the management server 3 (step 304).

Next, the backup control section 12 determines whether any other file to be restored exists (step 305). When any other restoration target file exists, processing step 301 is continuously executed. On the other hand, when any other restoration target file does not exist, the processing is ended.

Procedure Upon Restoration at Backup Destination Terminal 2

Figure 5:
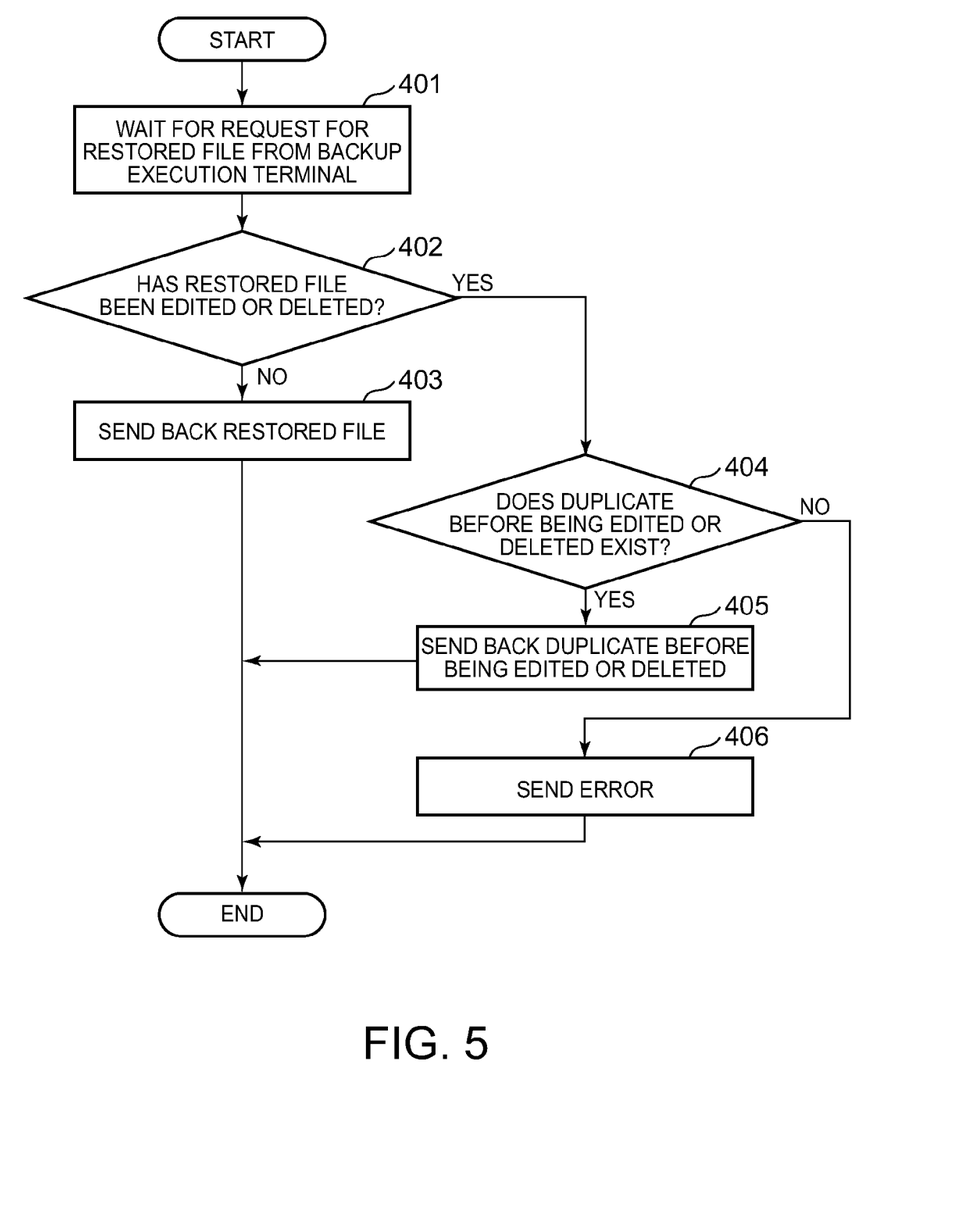
FIG. 5 is a flowchart showing an example of a procedure upon restoration at the backup destination terminal.

FIG. 5 is a flowchart showing an example of a procedure upon restoration at a backup destination terminal 2.

It is assumed as the initial state that the backup destination information managing section 21 waits for a request for a restored file from the backup execution terminal 1 (step 401). Then, when receiving a request for a restored file from the backup execution terminal 1, the backup destination information managing section 21 determines whether the requested restored file has been edited or deleted after receiving the setting notification from the backup execution terminal 1 (step 402). When the restored file is not edited or deleted, the file sending section 22 sends the restored file back to the backup execution terminal 1 (step 403).

On the other hand, when the restored file is edited or deleted by the user, the backup destination information managing section 21 determines whether a duplicate of the restored file before being edited or deleted exists (step 404). When a duplicate of the restored file before being edited or deleted exists, the file sending section 22 sends the duplicate of the restored file before being edited or deleted back to the backup execution terminal 1 (step 405). On the other hand, when no duplicate of the restored file before being edited or deleted exists, the file sending section 22 sends an error to the backup execution terminal 1 (step 406).

Monitoring Procedure for Identical File at Backup Destination Terminal 2

Figure 6:
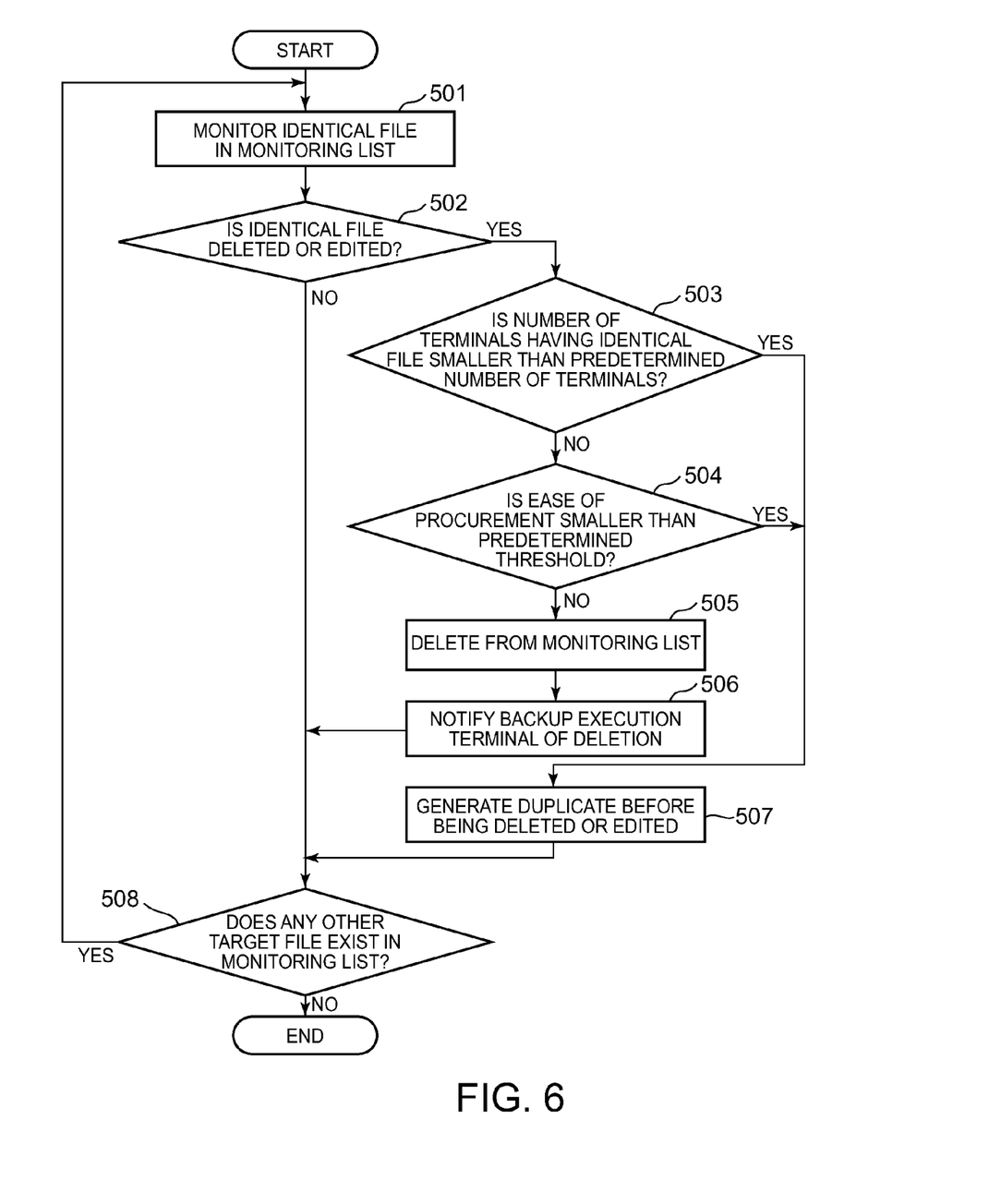
FIG. 6 is a flowchart showing an example of a monitoring procedure for the identical file at the backup destination terminal.

FIG. 6 is a flowchart showing an example of a monitoring procedure for an identical file at the backup destination terminal 2.

It is assumed as the initial state that the file monitoring section 23 monitors an identical file in the monitoring list (step 501). Then, the file monitoring section 23 determines whether the identical file in the monitoring list is edited or deleted by the user (step 502). When the identical file is edited or deleted by the user, the file monitoring section 23 requests, from the backup destination information managing section 21, up-to-date information on the number of procurement terminals for the target file and the ease of procurement before editing or deletion processing is confirmed. In response to the request from the file monitoring section 23, the backup destination information managing section 21 requests the backup execution terminal 1 to send up-to-date information on the number of procurement terminals for the target file and the ease of procurement.

When receiving the request from the backup destination terminal 2, the backup execution terminal 1 acquires, from the management server 3, a list of terminals having the identical file and terminal information on each terminal. Then, the backup execution terminal 1 calculates the number of procurement terminals for the target file and the ease of procurement from each terminal, and sends the calculated number of procurement terminals and ease of procurement back to the backup destination terminal 2.

Next, based on the number of procurement terminals sent from the backup execution terminal 1, the file monitoring section 23 determines whether the number of procurement terminals for the target file becomes smaller than a predetermined number of terminals because of the fact that the identical file is edited or deleted (step 503). When the number of procurement terminals is more than or equal to the predetermined number of terminals even if the identical file is deleted, the file monitoring section 23 next determines, based on the ease of procurement sent from the backup execution terminal 1, whether the ease of procurement of the target file becomes smaller than a predetermined threshold because of the fact that the identical file is edited or deleted (step 504). When the ease of procurement is more than or equal to the predetermined threshold even if the identical file is edited or deleted, the file monitoring section 23 deletes, from the monitoring list, the correspondence relationship between the backup execution terminal 1 and the identical file (step 505). Then, the file monitoring section 23 notifies the backup execution terminal 1 that the identical file is deleted from the monitoring list (step 506).

On the other hand, in step 503, when the number of procurement terminals becomes smaller than the predetermined number of terminals, the file monitoring section 23 generates a duplicate of the identical file (step 507). Similarly, in step 504, when the ease of procurement becomes smaller than the predetermined threshold, the file monitoring section 23 generates a duplicate of the identical file.

Next, when any other identical file exists in the monitoring list, the procedure returns to step 501 in which the file monitoring section 23 continuously monitors the identical file. When any other identical file does not exist in the monitoring list, the processing is ended (step 508).

In the above-mentioned flow, when the identical file is edited or deleted by the user, the file monitoring section 23 requests, from the backup destination information managing section 21, up-to-date information on the number of procurement terminals for the target file and the ease of procurement before editing or deletion processing is confirmed. Then, based on the up-to-date information sent from the backup execution terminal 1, the file monitoring section 23 determines whether to generate a duplicate of the identical file, and after that, the processing for editing or deleting the identical file is confirmed. Here, it may take time, due to a delay in the transmission of information from the backup execution terminal 1 or the like, from when a command for editing or deletion processing is entered by the user until the processing is confirmed. Therefore, the file monitoring section 23 may temporarily generate a duplicate of the identical file before determining whether to generate the duplicate of the identical file. When the file monitoring section 23 temporarily generates the duplicate of the identical file, the editing or deletion processing commanded by the user can be confirmed before determining whether to generate the duplicate of the identical file. When determining not to generate the duplicate of the identical file later, the file monitoring section 23 deletes the duplicate of the identical file temporarily generated.

In the embodiment, when determining a backup method, the backup execution terminal 1 acquires, from the management server 3, a list of terminals having the identical file and terminal information on each terminal having the identical file in regard to all terminals in the backup system, but the present invention is not limited thereto. For example, the terminals in the backup system may be divided into two or more groups so that the backup execution terminal 1 will acquire, from the management server 3, information on only terminals belonging to the same group as its own machine. When the backup execution terminal 1 acquires information on only terminals belonging to the same group, it is only necessary for the management server 3 to send back a list of terminals and terminal information in regard to the terminals in the same group, thereby reducing the processing load on the management server 3.

As the grouping, for example, terminals used by users whose social distance to the user of the backup execution terminal 1 falls within a certain range may be grouped in the same group as the backup execution terminal 1 based on the social distance as an index representing the association between the users of the terminals. It is assumed that the social distance is, for example, calculated based on information on organizations to which the users of the terminals belong, information on communities, the e-mail transmission/reception histories of the users of the terminals, or the like. In this case, since a user close in social distance to the user of the backup execution terminal 1 has a high association with the user of the backup execution terminal 1, it is considered that such a terminal of the user is likely to have the identical file.

For example, it is considered that the terminal of a user that is in the same organization or the same department as the user of the backup execution terminal 1 or a user that is in a department different from that of the user of the backup execution terminal 1 but having a strong business relation is likely to have the identical file. It is also considered that the terminal of a user belonging to the same community as the user of the backup execution terminal 1, such as a community of users who entered the company at the same time, is likely to have the identical file. In such cases, based on the organization or community to which each user belongs, the terminals of users belonging to the same organization as, to an organization having a relation with, or to the same community as the user of the backup execution terminal 1 are grouped in the same group as the backup execution terminal 1.

Users frequently exchanging e-mail or chat with the user of the backup execution terminal 1 are also considered to have a close social distance, and it can be said that the terminals of such users are likely to have the identical file. Further, users who exchange lots of e-mails with files attached are more likely to have the identical file. In this case, based on the transmission/reception history of e-mail or chat, the terminals of such users are grouped in the same group. Otherwise, based on SNS (Social Networking Service), the terminals of users having friendship with one another may be grouped in the same group.

As mentioned above, the backup execution terminal 1 extracts multiple terminals used by users whose social distance to the user of the backup execution terminal 1 fall within a certain range, i.e., multiple terminals determined to be likely to have the identical file, and groups the multiple terminals in the same group. This can increase the possibility of enabling the backup execution terminal 1 to restore the target file.

As another example of grouping, for example, multiple terminals the installation sites of which are distributed, rather than multiple terminals the installation sites of which are in close distance, may be grouped in the same group. When the installation sites are distributed, the identical file used for backup is distributed to multiple sites rather than being concentrated in one place. Therefore, geographical risks associated with disasters and the like can be reduced.

The backup execution terminal 1 just has to acquire only information on the terminals in the same group when determining a restoration method in the same manner as the case of determining a backup method.

First Modification of Backup System

In the backup system of the embodiment, the backup execution terminal 1 backs up the target file based on the value of ease of restoration. On the other hand, the system can also be a system in which the management server 3 functions to perform processing based on the value of ease of restoration.

The management server 3 receives, from each terminal in the backup system, a list of files owned on each terminal and terminal information. Here, for example, suppose that the management server 3 also stores a file in the list and the number of terminals having the file is more than or equal to a predetermined number of terminals. In this case, since a sufficient number of terminals deemed by the backup execution terminal 1 to be backup destinations exist, the need for the management server 3 to store such a file is low.

Therefore, for example, after an actual backup of the target file is performed by the backup execution terminal 1, when the number of procurement terminals becomes more than or equal to the predetermined number of terminals and a deemed backup is performed by the backup execution terminal 1, the management server 3 in this modification considers that the need to store the target file is low, and hence deletes the target file. Thus, the management server 3 determines whether there is a need to store each file based on the value of ease of restoration, and deletes files that can be determined to have a low need for storage so that free space can be increased. The management server 3 may list files that can be determined to have a low need for storage, and notify the user of the list, rather than deleting the files.

Further, for example, suppose that, among files in a list sent from each terminal, the number of terminals having a file is less than the predetermined number of terminals. In this case, the management server 3 in this modification may be configured to determine that a sufficient number of terminals that can be deemed by the backup execution terminal 1 to be backup destinations of the file do not exist and notify the user to perform an actual backup.

Second Modification of Backup System

The backup system of the embodiment includes the backup execution terminal 1, the backup destination terminals 2, and the management server 3, but the backup system can also function as a system including the backup execution terminal 1 and the backup destination terminals 2 without including the management server 3. The backup execution terminal 1 according to the embodiment selects a target file and acquires information from the management server 3. On the other hand, in this modification, since the backup system does not include the management server 3, information is exchanged between the backup execution terminal 1 and the backup destination terminals 2. In this case, each terminal exchanges information with other terminals on a regular basis, and this allows the terminal to acquire a list of files owned on the other terminals and terminal information on the other terminals.

Here, each terminal may exchange information with all other terminals in the backup system. However, as the number of terminals in the backup system increases, the amount of information to be exchanged increases, increasing the load on each terminal. Therefore, each terminal may exchange information with terminals in the same group to reduce the amount of exchanging information and the load on each terminal. Any one of the groups mentioned above may be used as this group. For example, terminals likely to have the identical file are grouped in one group.

Then, the backup execution terminal 1 performs either a deemed backup or an actual backup on the target file based on the value of ease of restoration. As the actual backup, for example, a configuration can be considered in which the file is recorded on a medium connected outside of the backup execution terminal 1.

REFERENCE SIGNS LIST

1 . . . Backup Execution Terminal, 2 . . . Backup Destination Terminal, 3 . . . Management Server, 10 . . . Owned File Storing Section, 11 . . . First Statistical Information Managing Section, 12 . . . Backup Control Section, 13 . . . File Sending/Receiving Section, 14 . . . Backup Method Determining Section, 15 . . . Restoration Method Determining Section, 16 . . . Backup Execution Information Managing Section, 20 . . . Second Statistical Information Managing Section, 21 . . . Backup Destination Information Managing Section, 22 . . . File Sending Section, 23 . . . File Monitoring Section, 24 . . . Deemed Target File Storing Section, 30 . . . Shared Information Managing Section, 31 . . . Backup Management Section, 32 . . . Backup File Storing Section

The invention claimed is:

1. A computer comprising a processor coupled to a memory having instructions stored therein that are operable when executed by the processor to perform steps of:

acquiring a list of other computers having a file identical to a target file to be backed up and owned on the computer, and terminal information on the other computers;

determining whether to execute a deemed backup process for deeming the file identical to the target file and owned on the other computers to be a backup duplicate of the target file based on the acquired list and the acquired terminal information; and responsive to determining to execute the deemed backup process, notifying the other computers having the file identical to the target file that the file identical to the target file is deemed to be a backup duplicate of the target file.

2. The computer according to claim 1, wherein the determining step calculates a degree of ease of acquisition for acquiring the file identical to the target file based on the list and the acquired terminal information to determine whether to execute the deemed backup process based on the calculated degree of ease of acquisition.

3. The computer according to claim 2, wherein the determining step calculates the degree of ease of acquisition based on social distance as an index representing association between users of computers to acquire the file identical to the target file from the other computers used by users whose social distance to the user of their own machine falls within a certain range.

4. The computer according to claim 3, wherein the social distance is calculated based on at least one of information on organizations to which users of the computers belong, information on communities to which the users of the computers belong, and e-mail transmission/reception histories of the users of the computers.

5. The computer according to claim 2, wherein the determining step calculates the degree of ease of acquisition to acquire the file identical to the target file from the other computers extracted as computers determined based on a predetermined criterion to be likely to have the file identical to the target file.

6. The computer according to claim 1, further comprising:

selecting any of the other computers from the acquired list to request, from the other computer selected, a file deemed to be a backup duplicate of the target file;

receiving the file deemed to be the backup duplicate of the target file; and restoring the target file from the received file deemed to be the backup duplicate of the target file.

7. The computer according to claim 6, wherein the determining step calculates a degree of ease of acquisition for acquiring the file identical to the target file based on the list and the acquired terminal information to determine whether to execute the deemed backup process based on the calculated degree of ease of acquisition.

8. A computer system in which a plurality of computers are operably coupled together, wherein a backup execution terminal for performing a backup among the plurality of computers comprises code executable by the backup execution terminal to perform steps of:

acquiring a list of backup destination terminals having a file identical to a target file to be backed up and owned on the backup execution terminal, and terminal information on the backup destination terminals;

determining whether to execute a deemed backup process for deeming the file identical to the target file and owned on the backup destination terminals to be a backup duplicate of the target file based on the acquired list and the acquired terminal information; and responsive to determining to execute the deemed backup process, notifying the backup destination terminals that the file identical to the target file is deemed to be a backup duplicate of the target file;

wherein each of the backup destination terminals comprises a backup storage system configured to store terminal information regarding the backup execution terminal and the file identical to the target file in association with each other when receiving, from the backup execution terminal, the notification that the file identical to the target file is deemed to be the backup duplicate of the target file.

9. The system according to claim 8, wherein each of the backup destination terminals further comprises code executable by each of the backup execution terminals to perform steps of:

monitoring whether the file identical to the target file in association with the backup execution terminal is edited or deleted; and generating, under a certain condition, a duplicate of the file before being edited or deleted when the file identical to the target file is edited or deleted.

10. The system according to claim 9, wherein when the file identical to the target file is edited or deleted, the backup destination terminal generates a duplicate of the target file on condition that a degree of ease of acquisition to which the backup execution terminal acquires the file identical to the target file is smaller than a predetermined threshold.

11. The system according to claim 8, wherein the computer is a backup execution terminal that deems the file identical to the target file as a backup duplicate of the target file without sending the target file as a part of the deemed backup process.

12. A computer system in which a server computer and a plurality of client computers are operably coupled together, wherein a backup execution terminal for performing a backup among the plurality of client computers comprises code executable by the backup execution terminal to perform steps of:

acquiring a list of backup destination terminals having a file identical to a target file to be backed up and owned on the backup execution terminal, and terminal information on the backup destination terminals;

calculating a degree of ease of acquisition for acquiring the file identical to the target file based on the acquired list and the acquired terminal information; and executing a deemed backup process for deeming the file identical to the target file and owned on the backup destination terminals to be a backup duplicate of the target file when the calculated degree of ease of acquisition is larger than or equal to a predetermined threshold, or executing an actual backup process for sending the target file to the server computer to perform a backup when the degree of ease of acquisition is smaller than the predetermined threshold;

wherein each of the backup destination terminals comprises a backup storage system configured to store terminal information regarding the backup execution terminal and the file identical to the target file in association with each other when receiving, from the backup execution terminal, a notification that the file identical to the target file is deemed to be the backup duplicate of the target file; and wherein the server computer comprises a server storage system configured to store the target file sent from the backup execution terminal when the actual backup process is executed.

13. The system according to claim 12, wherein when the degree of ease of acquisition becomes smaller than the predetermined threshold after the deemed backup process is executed on the target file, the backup execution terminal executes the actual backup process on the target file.

14. The system according to claim 12, wherein:

when the degree of ease of acquisition becomes larger than or equal to the predetermined threshold after the actual backup process is executed on the target file, the backup execution terminal executes the deemed backup process on the target file; and when backup execution terminal executes the deemed backup process on the target file after the server computer stores the target file sent from the backup execution terminal, the server computer deletes the stored target file.

15. The system according to claim 12, wherein the computer is a backup execution terminal that deems the file identical to the target file as a backup duplicate of the target file without sending the target file as a part of the deemed backup process.

16. A method performed by a computer, comprising steps of:

acquiring a list of other computers having a file identical to a target file to be backed up and owned on the computer, and terminal information on the other computers;

determining whether to execute a deemed backup process for deeming the file identical to the target file and owned on the other computers to be a backup duplicate of the target file based on the acquired list and the acquired terminal information; and responsive to determining to execute the deemed backup process, notifying the other computers having the file identical to the target file that the file identical to the target file is deemed to be a backup duplicate of the target file.

17. The method according to claim 16, wherein the computer is a backup execution terminal that deems the file identical to the target file as a backup duplicate of the target file without sending the target file as a part of the deemed backup process.

18. A method in which a server computer and a plurality of client computers are operably coupled together and a first computer in the plurality of client computers performs a backup, comprising steps of:

acquiring a list of second computers having a file identical to a target file to be backed up and owned on the first computer, and terminal information on the second computers;

calculating a degree of ease of acquisition to which the first computer acquires the file identical to the target file based on the list and the terminal information acquired;

executing a deemed backup process for deeming the file identical to the target file and owned on the second computers to be a backup duplicate of the target file when the calculated degree of ease of acquisition is larger than or equal to a predetermined threshold, or executing an actual backup process for sending the target file to the server computer to perform a backup when the degree of ease of acquisition is smaller than the predetermined threshold;

causing the second computers to store identifying information regarding the first computer and the file identical to the target file in association with each other when receiving, from the first computer, a notification that the file identical to the target file is deemed to be the backup duplicate of the target file; and causing the server computer to store the target file sent from the first computer when the actual backup process is executed.

19. A computer program stored on a non-transitory recording medium, the computer program causing a computer operably coupled to other computers to implement steps of:

acquiring a list of the other computers having a file identical to a target file to be backed up and owned on the computer, and terminal information on the other computers having the file identical to the target file to be backed up;

determining whether to execute a deemed backup process for deeming the file identical to the target file and owned on the other computers in the list to be a backup duplicate of the target file based on the acquired list and the acquired terminal information; and responsive to determining to execute the deemed backup process, notifying the other computers having the file identical to the target file that the file identical to the target file is deemed to be a backup duplicate of the target file.

20. The computer according to claim 1, wherein the computer is a backup execution terminal that deems the file identical to the target file as a backup target file without sending the target file as a part of the deemed backup process.

* * * * *